(12) United States Patent
Grell et al.

(10) Patent No.: US 9,233,675 B2
(45) Date of Patent: Jan. 12, 2016

(54) METHOD AND DEVICE FOR CARRYING OUT A STATIONARY HOLDING FUNCTION ON A MOTOR VEHICLE

(75) Inventors: Philipp Grell, Bietigheim-Bissingen (DE); Ulrich Mahlenbrey, Asperg (DE); Mark Unbescheiden, Markgroeningen (DE); Heiner Messner, Markgroeningen (DE); Raphael Oliveira, Untergruppenbach (DE); Julien Bregeault, Ludwigsburg (DE); Carsten Bodmann, Ludwigsburg (DE); Jens Kolarsky, Bietigheim/Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1768 days.

(21) Appl. No.: 12/088,964

(22) PCT Filed: Nov. 14, 2006

(86) PCT No.: PCT/EP2006/068436
§ 371 (c)(1),
(2), (4) Date: Sep. 8, 2008

(87) PCT Pub. No.: WO2007/062978
PCT Pub. Date: Jun. 7, 2007

(65) Prior Publication Data
US 2009/0055067 A1 Feb. 26, 2009

(30) Foreign Application Priority Data

Nov. 29, 2005 (DE) .......................... 10 2005 056 758
Jan. 18, 2006 (DE) .......................... 10 2006 002 352

(51) Int. Cl.
*B60T 7/12* (2006.01)
*B60T 8/48* (2006.01)

(52) U.S. Cl.
CPC ............... *B60T 8/4872* (2013.01); *B60T 7/122* (2013.01); *B60T 2201/06* (2013.01)

(58) Field of Classification Search
USPC ........................ 137/14, 467, 485–487, 487.5;
251/129.01–129.22, 187; 303/20, 22.4,
303/22.8, 41, 45, 60, 191; 700/282, 21;
701/70, 71, 76, 78
See application file for complete search history.

(56) References Cited

U.S. PATENT DOCUMENTS 5,452,946 A * 9/1995 Warner .................... 303/24.1
5,979,619 A * 11/1999 Rump ........................ 188/353
(Continued)

FOREIGN PATENT DOCUMENTS

DE 3507330 * 9/1986 ............... B60T 11/10
DE 4203541 * 6/1992 ................ B60T 7/12
(Continued)

OTHER PUBLICATIONS

Isermann et al., Fault-Tolerant Drive-By-Wire Systems, Oct. 2002, IEEE Control Systems, vol. 22, Issue 5, pp. 64-81.*
International Search Report, PCT International Patent Application No. PCT/EP2006/068436, dated Feb. 26, 2007.

*Primary Examiner* — Thomas G Black
*Assistant Examiner* — Luke Huynh
(74) *Attorney, Agent, or Firm* — Kenyon & Kenyon LLP

(57) ABSTRACT

A method for controlling a valve for maintaining brake pressure in a specified region of a brake circuit in a motor vehicle, in which the valve is controlled using a first control method, the specified region of the brake circuit is monitored with respect to the occurrence of a loss of brake pressure, and in response to a detected loss of brake pressure, the valve is controlled using a second control method.

17 Claims, 2 Drawing Sheets

(56) References Cited

U.S. PATENT DOCUMENTS

| | | | |
|---|---|---|---|
| 5,984,429 A * | 11/1999 | Nell et al. | 303/113.4 |
| 6,086,167 A * | 7/2000 | Heckmann et al. | 303/155 |
| 6,516,249 B1 * | 2/2003 | Hoyle et al. | 700/282 |
| 6,587,774 B2 * | 7/2003 | Hessmert et al. | 701/83 |
| 6,679,810 B1 * | 1/2004 | Boll et al. | 477/195 |
| 6,860,284 B2 * | 3/2005 | Wuerth et al. | 137/487.5 |
| 7,100,998 B2 * | 9/2006 | Holl | 303/191 |
| 2001/0028195 A1 * | 10/2001 | Yu | 303/155 |
| 2004/0025941 A1 * | 2/2004 | Wuerth et al. | 137/487.5 |
| 2005/0001481 A1 | 1/2005 | Kley et al. | |
| 2005/0017579 A1 | 1/2005 | Schmitt | |

FOREIGN PATENT DOCUMENTS

| | | | |
|---|---|---|---|
| DE | 10144879 | 9/2003 | |
| DE | 10343985 | 4/2004 | |
| EP | 0812747 | * 12/1997 | B60T 7/12 |
| JP | 10-59147 | 3/1998 | |
| JP | 11-78850 | 3/1999 | |
| JP | 11-321615 | 11/1999 | |
| JP | 2002-104147 | 4/2002 | |
| WO | WO 02/090159 | 11/2002 | |

* cited by examiner

METHOD AND DEVICE FOR CARRYING OUT A STATIONARY HOLDING FUNCTION ON A MOTOR VEHICLE

FIELD OF THE INVENTION

The present invention relates to a method for controlling a valve for maintaining brake pressure in a specified region of a brake circuit in a motor vehicle.

BACKGROUND INFORMATION

A method and a device for improving the pressure build-up dynamics in a brake circuit are described in German Patent Application No. 101 44 879 C1. The braking system described there is in a position to carry out driver-independent braking interventions. To do this, a switchover valve is blocked and a return pump is activated.

SUMMARY

The present invention relates to a method for controlling a valve for maintaining brake pressure in a specified region of a brake circuit in a motor vehicle, in which the valve is controlled using a first control method, the specified region of the brake circuit is monitored with respect to the occurrence of loss of brake pressure, and in response to a detected loss of brake pressure, the valve is controlled using a second control method.

The control using the second method particularly represents an optimized safety control, while the first control particularly represents a control optimized with respect to driver comfort. The less comfortable but safety-oriented control is carried out by an example embodiment of the present invention only if it is necessary to do so. This constitutes an improved driver comfort.

One advantageous refinement of the present invention is characterized in that the valve is the switchover valve in a brake circuit, and the specified region is the region between the switchover valve and the intake valves of the wheel brake cylinders.

One advantageous refinement of the present invention is characterized in that in the first control method, the valve is closed or kept closed using a specified electrical control, and in the second control method, the valve is at least partially opened again and is then closed again by the control.

Because of the at least partial opening, the valve needle is able to take up kinetic energy in the renewed closing process, and is thereby pressed into the sealing seat more forcefully during the closing process.

One advantageous embodiment of the present invention is characterized in that the second control method is carried out when the first control method has been carried out repeatedly, particularly a specified number of times, and after each of these executions a pressure loss was detected again.

One advantageous embodiment according to the present invention is characterized in that when a pressure loss is detected, the setpoint pressure is set once again via a driver-independent pressure build-up. This avoids a steady additional dropping off of the pressure.

One advantageous embodiment of the present invention is characterized in that, in the first execution of the first control method during a pressure holding phase, the valve is closed, and in each additional execution during this pressure holding phase, the valve is held closed. This avoids closing noise that is audible to the driver.

One advantageous embodiment of the present invention is characterized in that, in the first execution of the first control method during a pressure holding phase, the valve is closed, and in each additional execution, in these additional executions, the valve having applied to it a larger current than in the first execution. The supplying with a larger current presses the valve needle into the sealing seat more firmly than before.

One advantageous embodiment of the present invention is characterized in that the pressure holding phase is a locking in of the brake pressure within the scope of a vehicle stationary holding function or rather a stationary securing function of the motor vehicle.

One advantageous embodiment according to the present invention is characterized in that the specified region is a wheel brake cylinder or the region between a wheel brake cylinder and the intake valve.

Another advantageous embodiment of the present invention is characterized in that the execution of the first control method is connected with less noise than the execution of the second control method.

One advantageous refinement of the present invention is characterized in that the method for carrying out a vehicle stationary holding function of the motor vehicle is used, and in the case where, after carrying out the second control method, the vehicle nevertheless starts to roll or continues to roll, the brake pressure is increased independently of the driver.

Still another embodiment according to the present invention is characterized in that the brake pressure is increased independently of the driver at least until a vehicle standstill sets in.

Yet another advantageous embodiment of the present invention is characterized in that, upon closing the valve after the increase in the brake pressure, the second control method is used. Since the increase in the brake pressure takes place via the return pump, and is therefore encumbered with noise, the noise created by the second control method is no longer important, and may therefore be accepted.

Furthermore, the present invention includes a device for controlling a valve for maintaining brake pressure in a specified region of a brake circuit in a motor vehicle, having means for executing one of the methods described above.

The advantageous refinements of the example method according to the present invention manifest themselves also as advantageous embodiments of the device according to the present invention, and vice versa.

DETAILED DESCRIPTION OF EXAMPLE EMBODIMENTS

The present invention relates to the securing of a function which securely ensures the continued braking to a stop of a vehicle during its standstill. In this context, besides safety, the driver's comfort is the main point, in particular, a clearly perceptible pedal reaction as well as noises are to be avoided. As an example, let us examine a vehicle having a conventional hydraulic brake system, as shown in FIG. 1.

Driving dynamics regulating systems include functions which require decelerating or halting the vehicle when the brake is not operated, by locking in a pressure in the brake circuit. In doing this, the connection between the main brake cylinder designated as 112 in FIG. 1 and the intake valves designated by EV has to be blocked off by closing the switchover valves designated as USV, and, over the duration of a subsequent pressure holding phase, in the case of a nonoperated brake, the locked-in brake pressure is then present as the differential pressure over the switchover valve. A leak possibly occurring at the switchover valve would be able to lead to a very rapid pressure drop in the brake circuit, and would then require a renewed pressure build-up by the return pumps designated by 110. This renewed pressure build-up is connected with noises and thus a reduction in comfort for the passengers.

Figure 1:
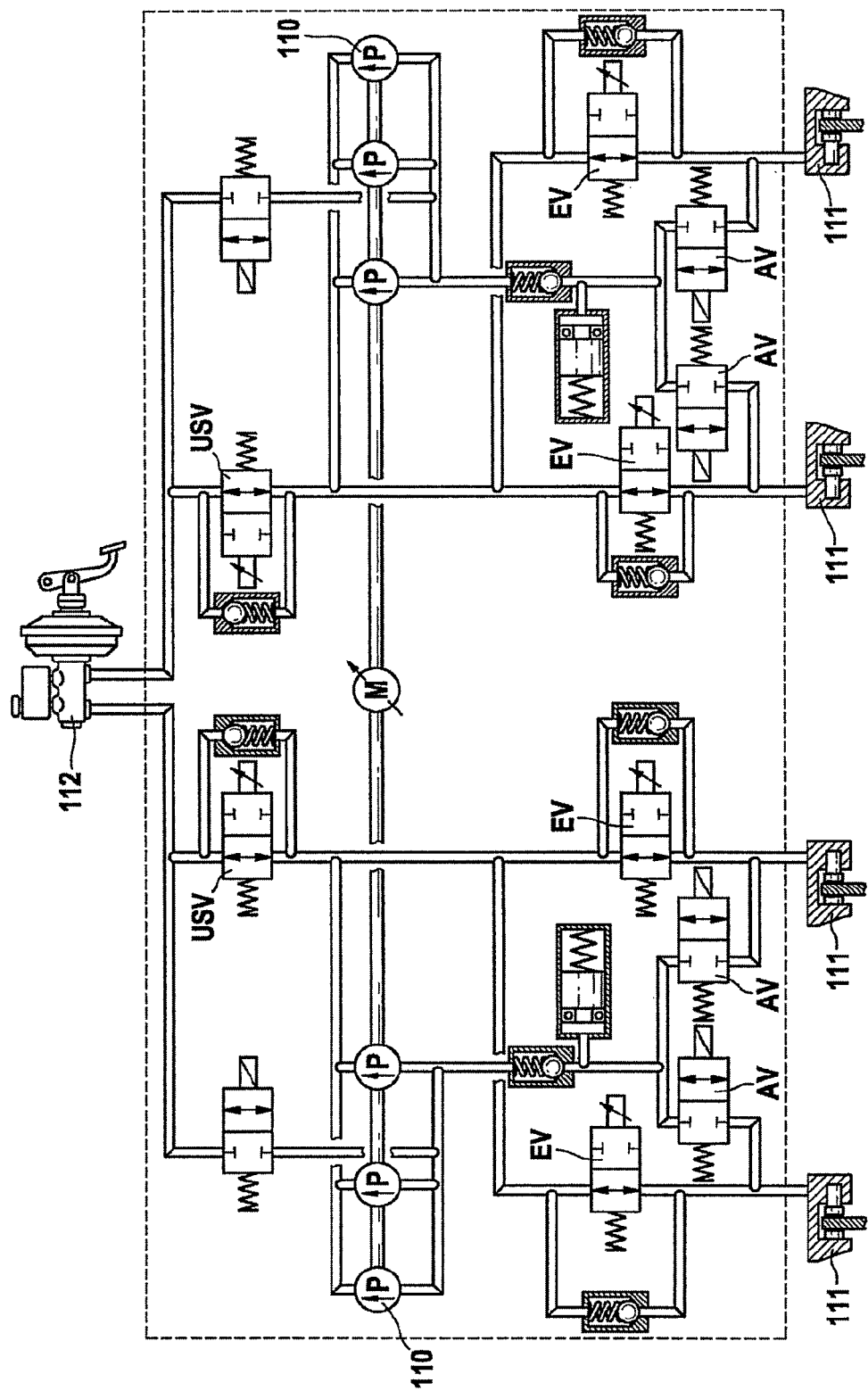
FIG. 1 shows the topology of a hydraulic brake circuit to which the present invention is applicable.

The wheel brake cylinders are denoted 111 in FIG. 1, and AV denotes the discharge valves.

The electrical control of the switchover valve during the closing process, that is, the transition to the pressure holding phase, has an influence on the tendency of the switchover valve to leak. This tendency to leak may be suppressed by an optimized control of the switchover valve.

The cause of the tendency to leak is the remaining minimum residual opening of the switchover valve after the closing process. This is able to occur when the switchover valve closes very slowly, that is, the valve tappet glides into the valve seat at a very low speed. In the process, on account of the surface roughness of the valve tappet and the valve seat, there may be mechanical sticking of the valve tappet and a slight residual opening between the valve tappet and the valve seat. This residual opening causes a pressure drop in the brake circuit.

The brake pressure in the wheel, or rather the brake circuit, is locked in via circuit pressure valves, in this case the ones marked USV. Based on leakiness in the valves, pressure losses in the brake circuit may occur, which, under certain circumstances, are even able to lead to rolling away of the vehicle. A valve control of the switchover valves which leads to a safe and leakage-free closing of these valves has clear-cut disadvantages as to the comfort of the driver. Such a closing process is particularly encumbered with a clearly perceptible pedal reaction as well as with noises. By contrast, in the case of valve control strategies which cause no pedal reaction, or rather, only a negligible one, and which do not have an effect on any considerable noise formation, one has to count on increased leakage. This yields a conflict of aims between noise and seal tightness.

An example design approach for solving this conflict of aims is achieved in that the valve control strategy of the USV behaves in a manner that is adaptive to the leakage behavior of the valves. The greater the leakage that is to be observed, the more the control, that was initially comfort-oriented, is given up and replaced by a seal tightness-oriented control.

The following sequence is intended as an example of a control strategy which offers a high degree of safety at the best possible comfort.

Step 1: Comfort-Oriented Activation of the Vehicle Holding Function:

In response to the activation of the function, a valve control is selected that corresponds to the desired comfort. Since the type of valve control selected here expires in each activation, the desire for a control that is as reaction-free and silent as possible is of primary importance. However, disadvantages with regard to seal tightness have to be taken into account.

Step 2: Leakage Detection and Comfort-Oriented Leakage Compensation:

When a pressure drop in the wheel brake cylinders is first detected, for instance, by using circuit pressure sensors or wheel cylinder pressure sensors, the desired setpoint pressure is produced again via an active pressure build-up. This pressure build-up is able to lead to the easy opening of the switchover valves. The safe closing of the valves after the pressure build-up is achieved, for the first N leakage compensations, by a brief but powerful energizing of the valves, particularly by a closing pulse. These current pulses are dimensioned in such a way that they ensure a high degree of comfort, that is, as little noise as possible. N is a specified number.

Step 3: Leakage Detection and Tightness-Oriented Leakage Compensation:

If leakage continues to take place, that is, even after N leakage compensations according to step 2 have taken place, if there is a renewed leakage, the control may then be broadened by an initiating opening pulse before the closing pulse. This closing process is louder, to be sure, but it favors the sealing behavior of the valves. Whereas in step 2 the closed valve is over-energized briefly in the closed state, in order to press the valve needle even more strongly into the valve seat, according to step 3 the valve is briefly at least partially opened again, and then is closed again using increased force. The previous opening path is used for the acceleration of the valve needle in the renewed closing.

Step 4: Tightness-Oriented Rolling Monitoring:

If the vehicle rolls away based on additional pressure loss, the brake pressure is actively increased until the vehicle's standstill has been produced again. In the final closing of the valves, the tightness-oriented control may be used, since the driver comfort has a subordinate priority in this instance. Furthermore, it may be meaningful to increase the rotary speed of the return pumps (denoted by 110 in FIG. 1), in order to achieve a more rapid pressure build-up.

Figure 2:
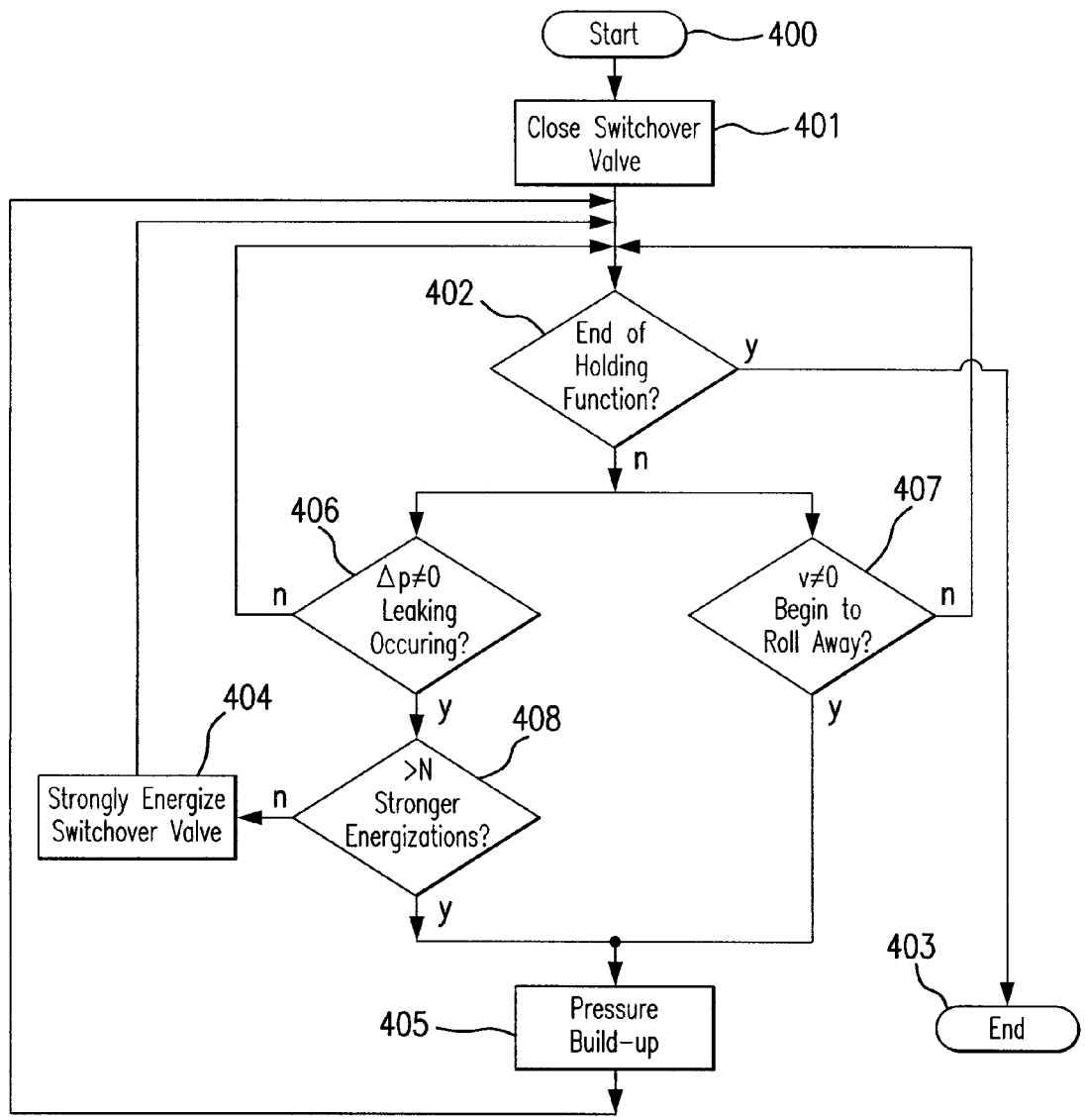
FIG. 2 shows the sequence of a form of execution method according to an example embodiment of the present invention.

The sequence of a specific embodiment of the method according to the present invention is shown in FIG. 2. After the start in block 400, in block 401 the switchover valve is closed for the first time, within the scope of an initiated stationary holding function. A query is then made in block 402 as to whether the holding function is to be ended. If the response is "yes" (indicated in FIG. 2 by "y"), then in block 403 the method is ended. If the answer is "no" (indicated by "n" in FIG. 2), then the system, in parallel, queries in block 406 whether leakage is occurring ($\Delta p \neq 0$) and queries in block 407 whether the vehicle is beginning to roll away ($v \neq 0$).

If there is no leakage according to block 406, the system returns to the input of block 402. However, if, according to block 406, leakage is occurring, then a query is made in block 408 whether n>N. If this is not the case, that is, if n≤N, then in block 404 the switchover valve is again more strongly energized or over-energized, in order to press the valve needle into the sealing seat. Moreover, in block 404 a renewed pressure build-up takes place by the return pump, in order to compensate for the pressure loss that has occurred. N characterizes the number of these stronger energizations that have occurred, in this context, and N their maximum permitted number. Subsequently to block 404, the system returns to the input of block 402. If the query in block 408 is fulfilled, that is, more than N stronger energizations have already been carried out and leakage is still occurring, then in block 405 the switchover valve is activated using a second control method:

For this, the valve is at least partially opened and is then closed again. In block 405 there is also a pressure build-up by the pump.

Subsequently to block 405, the system returns to the input of block 402.

If no present roll-away motion of the vehicle is detected in block 407, the system returns to the input of block 402. If, however, an incipient roll-away motion is established, the system proceeds to block 405.

Figure 3:
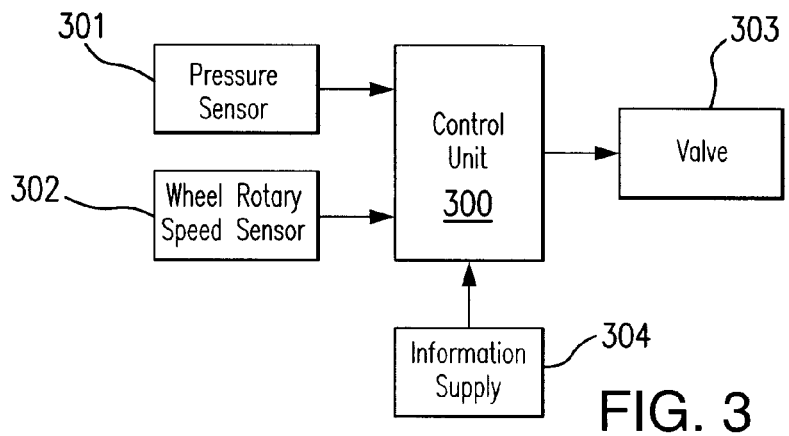
FIG. 3 shows the configuration of the device according to an example embodiment of the present invention.

The configuration of the example device according to the present invention is depicted in FIG. 3. Block 300, in this instance, characterizes a control unit which controls valve 303. In this context, block 300 receives at least the following input signals:

block 301 includes, for instance, a pressure sensor which supplies the value of the instantaneous brake pressure.

block 302 includes, for instance, a wheel rotary speed sensor and supplies information as to whether the vehicle is stationary at this instant or whether it is rolling.

Block 304 supplies the information to the control unit as to whether a stationary holding function is to be instantaneously carried out or not.

What is claimed is:

1. A method for controlling a valve for maintaining brake pressure in a specified region of a brake circuit in a motor vehicle, comprising:
   controlling the valve using a first control method;
   monitoring the specified region of the brake circuit with respect to an occurrence of a loss of brake pressure;
   determining a number of times that the loss of brake pressure had occurred while the controlling the valve using the first control method; and
   if the number is greater than a specified number, controlling the valve using a second control method,
   wherein the first control method causes the valve to close, and wherein current pulses used for closing the valve are determined according to a comfort level of a driver of the motor vehicle.

2. The method as recited in claim 1, wherein the valve is a switchover valve in the brake circuit, and the specified region is a region between the switchover valve and intake valves of wheel brake cylinders.

3. The method as recited in claim 2, wherein in the first control method, the valve is closed using a specified electrical control, and in the second control method, the valve is at least partially opened again and is then closed again by the control.

4. The method as recited in claim 1, wherein, in response to a detected pressure loss, a setpoint pressure is reset again via a driver-independent pressure build-up.

5. The method as recited in claim 1, wherein the valve is closed during a first execution of the first control method during a pressure holding phase, and at each additional execution during the pressure holding phase, the valve is closed or is kept closed.

6. The method as recited in claim 5, wherein the valve is closed during the first execution of the first control method during the pressure holding phase, and at each additional execution, during the pressure holding phase, the valve is kept closed, a higher current being applied to the valve during the additional executions than during the first execution.

7. The method as recited in claim 5, wherein the pressure holding phase includes a locking-in of the brake pressure within a scope of a vehicle stationary holding function of the motor vehicle.

8. The method as recited in claim 1, wherein the specified region is a wheel brake cylinder or a region between a wheel brake cylinder and an intake valve.

9. The method as recited in claim 1, wherein a method for carrying out a vehicle stationary holding function of the motor vehicle is used, and in a case where, after the execution of the second control method, the vehicle nevertheless starts to roll away or continues to roll away, the brake pressure is increased independently of a driver.

10. The method as recited in claim 9, wherein the brake pressure is increased independently of the driver at least until a vehicle standstill sets in.

11. The method as recited in claim 9, wherein the second control method is used in response to the closing of the valve after the increase in the brake pressure.

12. The method of claim 1, wherein the second method uses a higher force than the first method to ensure valve closing.

13. The method as recited in claim 1, wherein the valve is a switchover valve in the brake circuit, and the specified region is a region between the switchover valve and intake valves of wheel brake cylinders, wherein in the first control method, the valve is closed using a specified electrical control, and in the second control method, the valve is at least partially opened again and is then closed again by the control, wherein, in response to a detected pressure loss, a setpoint pressure is reset again via a driver-independent pressure build-up.

14. The method as recited in claim 13, wherein a method for carrying out a vehicle stationary holding function of the motor vehicle is used, and in a case where, after the execution of the second control method, the vehicle nevertheless starts to roll away or continues to roll away, the brake pressure is increased independently of a driver, wherein the brake pressure is increased independently of the driver at least until a vehicle standstill sets in, and wherein the second control method is used in response to the closing of the valve after the increase in the brake pressure.

15. The method as recited in claim 1, wherein the valve is closed during a first execution of the first control method during a pressure holding phase, and at each additional execution during the pressure holding phase, the valve is closed or is kept closed, wherein the valve is closed during the first execution of the first control method during the pressure holding phase, and at each additional execution, during the pressure holding phase, the valve is kept closed, a higher current being applied to the valve during the additional executions than during the first execution, and wherein the pressure holding phase includes a locking-in of the brake pressure within a scope of a vehicle stationary holding function of the motor vehicle.

16. The method as recited in claim 15, wherein a method for carrying out a vehicle stationary holding function of the motor vehicle is used, and in a case where, after the execution of the second control method, the vehicle nevertheless starts to roll away or continues to roll away, the brake pressure is increased independently of a driver, wherein the brake pressure is increased independently of the driver at least until a vehicle standstill sets in, and wherein the second control method is used in response to the closing of the valve after the increase in the brake pressure.

17. A device for controlling a valve for maintaining brake pressure in a specified region of a brake circuit in a motor vehicle, the device adapted to perform the steps of:
   controlling the valve using a first control method;
   monitoring the specified region of the brake circuit with respect to an occurrence of a loss of brake pressure;

determining a number of times that the loss of brake pressure had occurred while the controlling the valve using the first control method; and if the number is greater than a specified number, controlling the valve using a second control method, wherein the first control method causes the valve to close, and wherein current pulses used for closing the valve are determined according to a comfort level of a driver of the motor vehicle.

* * * * *